United States Patent Office 3,704,264
Patented Nov. 28, 1972

3,704,264
ENCAPSULATION OF MONOMERIC MATERIALS
Jeremy W. Gorman, Simsbury, Conn., assignor to Loctite Corporation, Newington, Conn.
No Drawing. Continuation of abandoned application Ser. No. 699,382, Jan. 22, 1968. This application Dec. 16, 1970, Ser. No. 98,884
Int. Cl. B01j 13/02; B44d 1/02
U.S. Cl. 252—316                12 Claims

ABSTRACT OF THE DISCLOSURE

Single component microcapsules can be prepared by forming or injecting small, discrete portions of liquid monomeric composition capable of homopolymerization in a fluid containing a polymerization catalyst. A shell of homopolymer forms around the core of the liquid monomeric composition. The liquid monomeric composition employed is an anaerobic composition consisting essentially of a polymerizable acrylate ester monomer and an organic hydroperoxide polymerization initiator therefor.

CROSS REFERENCE TO RELATED APPLICATION

This application is a continuation of Ser. No. 699,382, filed Jan. 22, 1968, now abandoned.

BACKGROUND OF THE INVENTION

Encapsulation techniques (wherein a core of one material, generally a liquid, is covered with a layer of a normally solid second material) are playing a progressively more important role in the chemical process industries. These techniques have eased the problem of handling many tacky, corrosive, or highly reactive materials, and, more important, have provided an avenue whereby normally liquid materials can be used in applications where normally solid ones had been required. Typical examples of liquids which have been disclosed as adaptable to encapsulation techniques are ink, adhesives, pharmaceuticals and oils.

A sizable number of encapsulating materials have been used in the past. The most common are hydrophilic colloids which are deposited on the surface of the liquid. See, for example, U.S. Pat. 2,800,457 to Green et al., issued July 23, 1957. More recently, petroleum-based polymers have been used to form encapsulating shells by bringing small particles of core material into contact with copolymeric reactants. Under polymerization conditions, the reactants polymerize at the surface of the core material to form an encapsulating shell. See, for example, U.S. Pats. 3,219,476 to Robbins, issued Nov. 23, 1965, and 3,270,100 to Jolkovski et al., issued Aug. 30, 1966.

Recently, there has been increasing interest in the encapsulation of polymerizable substances, and particularly in the separate encapsulation of copolymeric reactants. In this manner the two substances can be mixed without fear of premature reaction. For example, epoxy monomer and hardener have been encapsulated separately in copolymeric shells, and the encapsulated particles have been mixed and stored together. At the time of use, application of sufficient heat or force ruptures the capsules and the epoxy cures in the conventional manner to form an epoxy resin.

In many applications, it is undesirable to encapsulate polymerizable materials in a shell of a foreign substance, i.e., one other than the polymer formed from the polymerization of the core substance. This is particularly true when dealing with monomers which are to be used in adhesives or adhesive-type sealants. Frequently, foreign materials have been found to affect adversely the strength or continuity of the bond between the polymer and the adjacent surfaces. This problem is particularly acute when dealing with homopolymers, i.e., a polymeric material which is formed by successive reactions between a monomer with other molecules of the same monomer. The introduction of any second reactant to form a skin over a core of this material automatically introduces an undesired foreign substance to the monomeric material. Encapsulated homopolymerizable monomers wherein the capsule shell is formed from the homopolymer itself, would be extremely useful and desirable compositions of matter. A process for producing such a product also would be useful and desirable.

THE INVENTION

It has been found that an encapsulated homopolymeric composition can be prepared in accordance with the invention disclosed herein. Specifically, the composition of this invention is an encapsulated homopolymerizable composition which comprises a core of a liquid monomeric composition and, covering the core, a shell of the homopolymer of the monomeric composition. Encapsulated products of this type can be prepared by introducing discrete portions of a monomeric composition capable of homopolymerization into a fluid, and therein contacting the portions with a polymerization catalyst capable of promoting homopolymerization of the monomeric composition, and removing the portions from the fluid after an encapsulating shell of homopolymer has been formed. This process provides monomeric compositions encapsulated in a shell of homopolymer formed in situ from the monomeric composition.

The encapsulated products described above are unique in several respects. They constitute a single component encapsulated product, i.e., a polymerizable monomeric composition in a shell of its own homopolymer. When used to serve an adhesive or sealing function, there is no diluent material present to affect adversely the strength or continuity of the bond which is formed between the adhesive material and the bonded surfaces.

Similarly, the process described above presents a number of advantages over prior art encapsulation processes. It provides a method for preparing the single component encapsulated product described above. Further, no separate encapsulating material need be used in the process since the shell is formed from the core material itself. The only component which needs to be supplied to the system continuously is the monomeric composition; little, if any, of the polymerization catalyst is consumed during the forming of the capsule shell. Periodic additions of small amounts of the catalyst to replace the minor amounts lost or consumed are all that is required.

DESCRIPTION OF THE INVENTION AND ITS PREFERRED EMBODIMENTS

(A) The composition

The polymerizable monomeric composition used in this invention can be any monomeric material capable of homopolymerization under the stimulation of a polymerization catalyst. As used herein, "polymerization catalyst" refers to a material which, without materially participating in the polymerization, either instigates homopolymerization in the monomeric composition, or one which increases by, e.g., several orders of magnitude, an existing but extremely slow homopolymerization reaction in the monomeric composition. In either case, the result is the promotion of homopolymerization in a monomeric composition which by itself is stable for a prolonged period of time, e.g., several months or more.

As used herein, "monomeric composition" refers not only to a single monomer in the pure or impure state, but also to single monomers in conjunction with one or more non-polymerizable functional ingredients, such as stabilizers and polymerization accelerators, and to mixtures of related monomers which react to form a single type of polymer when subjected to the influence of a polymerization catalyst.

While numerous monomeric compositions can be used in the invention disclosed herein, monomeric compositions which have been found particularly adaptable to use are the polymerizable liquid anaerobic adhesives and sealants (hereinafter sometimes referred to jointly as "anaerobic adhesives"). Anaerobic adhesives are formulated from polymerizable acrylate ester monomers and peroxy polymerization initiators; they remain stable in the presence of air or oxygen but, when removed from the presence of air or oxygen, will polymerize to form hard, durable resins. This type of adhesive is particularly adaptable to the bonding of metals and other non-porous or non-air permeable materials since they effectively exclude air and oxygen from contact with the adhesive, and therefore the adhesive polymerizes and bonds the surfaces together. Of particular utility as adhesive monomers are polymerizable di- and other polyacrylate esters since, because of their ability to form cross-linked polymers, they have more highly desirable adhesive properties. However, monoacrylate esters can be used, particularly if the non-acrylate portion of the ester contains a hydroxyl or amino group, or other reactive substituent which serves as a site for potential cross-linking. Examples of monomers of this type are hydroxyethyl methacrylate, cyanoethyl acrylate, t-butylaminoethyl methacrylate and glycidyl methacrylate. Anaerobic properties are imparted to the acrylate ester monomers by combining with them a peroxy polymerization initiator as discussed more fully below.

One of the most preferable groups of polyacrylate esters which can be used in the adhesives disclosed herein are polyacrylate esters which have the following general formula:

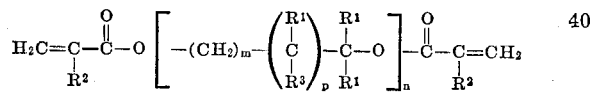

wherein $R^1$ represents a radical selected from the group consisting of hydrogen, lower alkyl of from 1 to about 4 carbon atoms, hydroxy alkyl of from 1 to about 4 carbon atoms, and

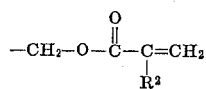

$R^2$ is a radical selected from the group consisting of hydrogen, halogen, and lower alkyl of from 1 to about 4 carbon atoms; $R^3$ is a radical selected from the group consisting of hydrogen, hydroxyl, and

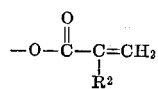

$m$ is an integer equal to at least 1, e.g., from 1 to about 15 or higher, and preferably from 1 to about 8 inclusive; $n$ is an integer equal to at least 1, e.g., 1 to about 20 or more; and $p$ is one of the following: 0, 1.

The polymerizable polyacrylate esters utilized in accordance with the invention and corresponding to the above general formula are exemplified by but not restricted to the following materials: di-, tri- and tetraethylene glycol dimethacrylates, dipropylene glycol dimethacrylate, polyethylene glycol dimethacrylate, di(pentamethylene glycol) dimethacrylate, tetraethylene glycol diacrylate, tetraethylene glycol di(chloroacrylate), diglycerol diacrylate, diglycerol tetramethacrylate, tetramethylene dimethacrylate, ethylene dimethacrylate, neopentyl glycol diacrylate and trimethylol propane triacrylate. The foregoing monomers need not be in the pure state, but may comprise commercial grades in which inhibitors or stabilizers, such as polyhydric phenols, quinones, etc. are included. As used herein, the term "polymerizable acrylate ester monomer" includes not only the foregoing monomers in the pure and impure state, but also those other compositions which contain those monomers in amounts sufficient to impart to the compositions the polymerization characteristics of polyacrylate esters. It is also within the scope of the present invention to obtain modified characteristics for the cured composition by the utilization of one or more monomers within the above formula with other unsaturated monomers, such as unsaturated hydrocarbons or unsaturated esters.

The preferred peroxy initiators for use in combination with the polymerizable acrylate or polyacrylate esters described above are the hydroperoxy polymerization initiators, and most preferably the organic hydroperoxides which have the formula $R^4OOH$, wherein $R^4$ generally is a hydrocarbon radical containing up to about 18 carbon atoms, preferably an alkyl, aryl or aralkyl radical containing from 1 to about 12 carbon atoms. Typical examples of such hydroperoxides are cumene hydroperoxide, methylethylketonehydroperoxide, and hydroperoxides formed by the oxygenation of various hydrocarbons, such as methylbutene, cetane and cyclohexene. However, other peroxy initiators, such as hydrogen peroxide or materials such as certain organic peroxides or peresters which hydrolyze or decompose to form hydroperoxides frequently can be used.

The peroxy initiators which are used commonly comprise less than about 20% by weight of the combination of monomer and initiator since above that level they begin to affect adversely the strength of the adhesive bonds which are formed. Preferably the peroxy initiator comprises from about 0.1 to about 10% by weight of the combination.

Other materials can be added to the mixture of polymerizable acrylate ester monomer and peroxy initiator, such as quinone or polyhydric phenol stabilizers, tertiary amine or imide accelerators, and other materials, such as thickeners, coloring agents, etc. These additives are used to obtain commercially desired characteristics, i.e., suitable viscosity and shelf stability for extended periods (e.g., a minimum of one, and preferably at least six months). The presence of these additives is particularly important when peroxy initiators other than organic hydroperoxides are used. For a complete discussion of the anaerobic systems and anaerobically curing compositions, reference is made to the following U.S. patents: 2,895,950 to Vernon K. Krieble, issued July 21, 1959; 3,041,322 to Vernon K. Krieble, issued June 26, 1962; 3,043,820 to Robert H. Krieble, issued July 10, 1962; 3,046,262 to Vernon K. Krieble, issued July 24, 1962; 3,203,941 to Vernon K. Krieble, issued Aug. 31, 1965; 3,218,305 to Vernon K. Krieble, issued Nov. 16, 1965; and 3,300,547 to J. W. Gorman et al., issued Jan. 24, 1967.

The reason the polymerizable, liquid anaerobic adhesives are preferred monomeric compositions within this invention is because these encapsulated products have particular utility in the bonding of non-porous materials, particularly metals. The anaerobic properties make them particularly useful in the encapsulated state since the capsules can be preapplied to parts which are destined for assembly. Sufficient oxygen will permeate the capsule wall to inhibit cure of the monomeric composition. The capsule-coated parts can be stored for long periods of time and shipped without loss of the adhesive material. At the time of assembly, pressure between the two surfaces to be joined will rupture the capsules and the anaerobic adhesive will be released and coat the surfaces. Cure will begin immediately due to the absence of air between the surfaces. No other single component adhesive has been found which can be encapsulated to perform this function. Since the shell walls are composed of the same homopolymer as is formed by the curing of the monomeric core material, no foreign material is present to affect adversely the continuity of the bonds formed between the two surfaces.

These monomeric compositions also are preferred because they have been found to be particularly adaptable to the processing requirements (which are fully described below) because of the speed with which the shell walls can be formed and because of the wide range of viscosities which can be provided, thus making discrete particle formation more easily achievable over a wide range of processing conditions.

(B) The process

In the process of the invention described herein, the monomeric composition is introduced in discrete portions into a fluid, and therein contacted with the polymerization catalyst for a sufficient period of time to permit formation of an encapsulating shell of homopolymerized monomeric composition. The size of the final encapsulated product is determined primarily by the size of the discrete portions of monomeric composition which are introduced into the fluid, and therefore the method of introducing these portions will depend in large part on the type of final product desired.

Contemplated for use in the process described herein are portions of monomeric composition which are injected into the fluid in discrete form, such as by spraying from outside the fluid. The invention also contemplates in situ formation of the portions, such as by adding the monomeric composition to a liquid in which the composition is substantially insoluble, and then, by means of vigorous agitation, distributing the monomeric composition in small discrete portions throughout the liquid.

To form small-sized microcapsules, the most convenient methods of introducing the discrete portions of monomeric composition are by spraying the monomeric composition into the fluid or by use of the in situ method described in the preceding paragraph. Larger capsules can be formed by allowing large droplets to fall from tubes or through a perforated plate.

While in many instances the fluid can be a gas, such as in a conventional spray tower, it is preferable that a liquid be used, particularly when dealing with the preferred anaerobic monomeric compositions disclosed above.

The liquid system provides a more reactive and versatile system, and control of particle size and shell wall thickness is more easily obtained than in the gaseous state. It has been found that the discrete particles of the monomeric composition can be formed in a number of ways. For example, large droplets can be dropped into the liquid phase from tubes, such as pipettes, and if the droplets are sufficiently large, they will easily penetrate the liquid surface without losing their discrete character. However, this method generally is not totally effective when dealing with small droplets since the droplets of monomeric composition tend to congregate at or near the top surface of the liquid, and thus make retention of their discrete character more difficult. It has been found that small capsules can be introduced from tubes if the tubes are held slightly below the surface of the liquid and the liquid is agitated during the introduction process. The size of the capsules will depend upon the size of the bore of the tube and the degree of agitation; with smaller bores and greater agitation smaller capsules are formed. Conversely, with large bore tubes and little or no agitation larger capsules will be formed.

For the manufacture of large quantities of capsules, generally it is preferable to mix the monomeric composition in the liquid phase and provide vigorous agitation, relying on the agitation to promote the formation of the discrete portions of monomeric composition in situ. To aid in maintaining these particles in discrete form until the encapsulating shell is formed, surface active substances can be added to the liquid. Naturally, it generally is preferable to add the polymerization catalyst after formation of the discrete particles, although this is not absolutely necessary. If the agitation is sufficiently vigorous, the monomeric composition can be added subsequent to the catalyst and satisfactory results obtained. When using the liquid system for capsule formation, the liquid must be one in which the monomeric composition is substantially insoluble. If the monomeric composition is readily soluble in the liquid, the discrete particles will be destroyed prior to capsule formation. When dealing with the preferred anaerobic monomeric compositions described above, the most desirable liquid is water.

As indicated above, the polymerization catalysts can be any which promote homopolymerization in the monomeric composition. A number of such catalysts generally are available for any homopolymerizable monomer. The preferred catalysts for use in the liquid system described above for the encapsulation of anaerobic monomeric compositions are sulfur dioxide and sodium bisulfite. Both of these materials are soluble in water and provide sufficiently rapid homopolymerization on the surfaces of the discrete portions of the monomeric composition, thus providing the capsules of the invention disclosed herein.

The amount of catalyst which is used in conjunction with the fluid need only be adequate to promote the homopolymerization reaction described herein. While this varies from one system to another, it has been found that generally 0.01% by weight catalyst in water is adequate for the encapsulation of the anaerobic monomeric compositions. Preferably the amount of catalyst is between about 0.05% and about 3.0% by weight of the water. The upper limit is basically a question of convenience, but little if any benefit is achieved by using more than about 5% catalyst by weight of the water. However, when using a very soluble catalyst such as sodium bisulfite, solutions up to the saturation point of the catalyst in water can be used without a substantial change in result except, perhaps, formation of a somewhat thicker capsule shell wall.

(C) The product

Encapsulated particles disclosed herein can vary in size from particles commonly known as microcapsules, typically from about 25 to about 750 microns in size, to those which are commonly referred to as macrocapsules, typically from about 1,000 to about 3,000 microns in size, or even larger. The maximum size of the encapsulated products of this invention is limited only by the method of production, as is discussed above.

The microcapsules have greater versatility and use potential and constitute a preferred embodiment of this invention. The most highly preferred size range is from about 50 to about 500 microns in size because this particle size range has been found particularly useful for anaerobic adhesives and sealants. Capsules larger than about 500 microns, and particularly if larger than about 750 microns, are difficult to retain affixed to a surface, and are too large for easy handling and application. Further, particles in the 50 to 500 micron size range specified above are small enough to fit between the threads of most threaded objects, such as screws, nuts and bolts, and standard pipe threads on small threaded pipe and connections. It is necessary for the capsules, when used in this particular application, to fit between the threads in order to prevent their removal by the mating surfaces during the joining operation.

Capsules of this invention find wide ranges of applications. Sealants and adhesives, particularly the one-component anaerobic sealants and adhesives described above, can be prepared and pre-applied to pieces which are destined for assembly. Typical examples of products which have been found adaptable to the pre-application of encapsulated adhesives and sealants are nuts, bolts, screws, studs, nails, rivets, pins, keyweys, threaded or flanged pipe, press fittings such as metal tubing, and various hydraulic fittings, bottle caps, and metal labels, etc. Thus, the encapsulated products make available a means of pre-application of adhesives and sealants to parts destined for assembly wherein the adhesive or sealant will be free from diluents or foreign materials which have been common to encapsulated products of the prior art.

In addition to the adhesives and sealants, this invention makes available other encapsulated homopolymerizable products with advantages similar to those described above. The encapsulated product, regardless of its intended use, will be free from diluents and foreign materials which may impede the performance of the product. In general, shipment and handling is made easier in that the encapsulated liquids can be handled in much the same manner as solids, e.g., in bags, boxes, or containers of plastics or other materials which are incompatible with or impractical for the liquid monomeric composition. At the point of intended use, application of heat or pressure will rupture the capsules and release the monomeric composition to perform its intended function.

EXAMPLES

The following examples are given to demonstrate the preparation of encapsulated products within the scope of the invention described herein, i.e., liquid monomeric compositions encapsulated within a shell of a homopolymer formed from that monomeric composition. They also demonstrate the use of processes described herein for preparing encapsulated monomeric compositions. The examples are not intended to be limitations upon this invention. Unless stated to the contrary, all ratios and percentages in the examples are on a weight basis.

EXAMPLE 1

A homopolymerizable liquid monomeric composition was prepared by mixing the following approximate amounts of the indicated materials: polyethyleneglycol dimethacrylate (ave. molecular weight=330)—90 grams; cumene hydroperoxide—6 grams; tributylamine—4 grams; minor ingredients (dye, quinone)—less than 0.1 gram.

Five milliliters of the above monomeric composition were slowly injected (approx. 3 milliliters per minute) through a No. 20 gauge needle (0.035 inch O.D.) into 200 milliliters of a 1% by weight aqueous solution of sodium bisulfite. During injection, the solution was stirred at medium speed with a magnetic stirrer (approx. 250 r.p.m.). Discrete droplets of the monomeric composition were formed at the tip of the needle, and were removed by the action of the stirred sodium bisulfite solution.

The sodium bisulfite in the solution served to catalyze in situ homopolymerization at the surface of the droplets, producing a homopolymer shell wall around a core of liquid monomeric composition. After about two minutes the capsules were removed from the solution by straining, were washed several times with water, and then were spread on filter paper and allowed to dry.

On the following day the capsules were examined; the average particle diameter was about 650 microns, and the core liquid (the unpolymerized monomeric composition) comprised about 80% of the total weight of the capsules.

EXAMPLE 2

Five milliliters of the homopolymerizable liquid monomeric composition of Example 1 were injected at an approximate rate of 5 milliliters per minute into 200 milliliters of a 0.1% by weight aqueous solution of sulfur dioxide. A No. 27 gauge needle (0.016 inch O.D.) was used, and the rate of agitation was approximately 200 r.p.m.

As in Example 1, the product which formed was a core of liquid monomeric composition encapsulated by a shell of homopolymer produced from the monomeric composition. The encapsulated product was removed from the solution and washed and dried as described in Example 1.

On the following day, the capsules were examined; the average particle diameter of the capsules was about 750 microns and the core liquid comprised about 85% of the total weight of the capsules.

EXAMPLE 3

Thirty liters of water containing 0.23% by weight sodium polyacrylate were added to a thirty gallon polyethylene tank, and agitated at 350 r.p.m. by means of a one-half horsepower motor equipped with propeller-type agitator blades.

Three liters of a liquid, homopolymerizable, monomeric composition were prepared by mixing the following materials in the approximate percentages listed below:

| Materials: | Wt. percent (approx.) |
|---|---|
| Polyethyleneglycol dimethacrylate (ave. molecular weight=330) | 93.3 |
| Acrylic acid | 3.0 |
| Cumene hydroperoxide | 3.0 |
| Latent accelerator (4:3 weight ratio of benzoyl sulfimide and dimethyl-p-toluidine) | 0.7 |
| Minor ingredients (dye, quinone) | >0.1 |
| | 100.0 |

The three liters of monomeric composition were slowly poured into the agitated aqueous solution, and agitation was continued for fifteen minutes following the addition. The monomeric composition, after the addition and agitation, was present in the form of discrete portions suspended in the aqueous solution.

While continuing the agitation, approximately 15 grams of sodium bisulfite dissolved in approximately 35 milliliters of water were slowly added to the water-monomeric composition mixture. Agitation was continued for approximately one minute, and then the mixture was drained through a cheesecloth filter. The encapsulated product remained on the filter; it was allowed to drain for several minutes, was washed repeatedly with water and then was set aside to dry.

On the following day, the encapsulated product was screened and in excess of 90% by weight of the capsules were found to be between about 175 and about 500 microns in diameter. Examination disclosed that the core liquid comprised about 75% of the total weight of the capsules.

The encapsulated products described in Examples 1 through 3, inclusive, are shelf stable products. The anaerobic liquid core will remain in the unpolymerized state for prolonged periods of time, such as six months or more. The shell walls are sufficiently air-permeable to allow adequate oxygen to reach the liquid and inhibit polymerization. The encapsulated products can be affixed to parts destined for assembly, e.g., nuts and bolts, or pipe threads, and at the time of use the joining of the mating parts will rupture the capsules and release the liquid monomeric composition. Because of the nature of the mating parts, air will be excluded and the anaerobic product will cure in the intended fashion.

I claim:

1. An encapsulated product comprising a stable, liquid core of polymerizable anaerobic composition enclosed within a polymer shell; said anaerobic composition consisting essentially of a polymerizable acrylate ester monomer and less than 20% by weight of said anaerobic composition of an organic hydroperoxide polymerization initiator for said monomer, and said polymer shell consisting essentially of a polymer of said polymerizable acrylate ester monomer.

2. The encapsulated product of claim 1 wherein the organic hydroperoxide comprises from about 0.1% to about 10% by weight of the anaerobic composition.

3. The encapsulated product of claim 2 wherein the organic hydroperoxide has the formula ROOH wherein R is a hydrocarbon group containing up to about 18 carbon atoms, and the acrylate ester monomer is a polyacrylate ester monomer having the formula:

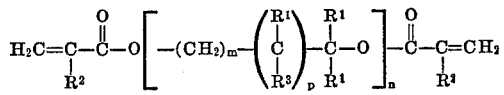

wherein $R^1$ represents a radical selected from the group consisting of hydrogen, lower alkyl of from 1 to about 4 carbon atoms, hydroxy alkyl of from 1 to about 4 carbon atoms, and

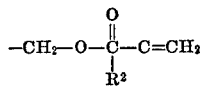

$R^2$ is a radical selected from the group consisting of hydrogen, halogen, and lower alkyl of from 1 to about 4 carbon atoms; $R^3$ is a radical selected from the group consisting of hydrogen, hydroxyl,

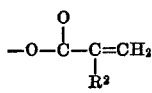

$m$ is an integer equal to at least 1; $n$ is an integer equal to at least 1; and $p$ is one of the following: 0, 1.

4. The encapsulated product of claim 2 which has an average particle size of from about 50 to about 750 microns.

5. The process for preparing encapsulated polymerizable liquid anaerobic compositions, said anaerobic compositions consisting essentially of a polymerizable acrylate ester monomer and less than 20% by weight of said anaerobic composition of an organic hydroperoxide polymerization initiator for said monomer, which comprises forming discrete droplets of said anaerobic composition in a fluid in which the anaerobic composition is substantially insoluble, and contacting the outer surface of said discrete droplets with a polymerization catalyst for said anaerobic composition to form in situ an encapsulating shell of polymer from said acrylate monomer enclosing a stable core of said liquid anaerobic composition.

6. The process of encapsulating a polymerizable liquid anaerobic composition which comprises introducing discrete droplets of the anaerobic composition into a fluid with which the anaerobic composition is immiscible, exposing the droplets to a polymerization catalyst for the anaerobic composition, the catalyst being contained in the fluid and capable of rapidly polymerizing the anaerobic composition at the surface of the droplets, and after formation of a solid polymerized shell encapsulating a stable, liquid core of anaerobic composition, removing the encapsulated anaerobic composition from the fluid; said anaerobic composition consisting essentially of a polymerizable acrylate ester monomer and less than about 20% by weight of said anaerobic composition of an organic hydroperoxide polymerization initiator for said monomer.

7. The process of claim 6 wherein the fluid is water and the polymerization catalyst is sulfur dioxide or sodium bisulfite.

8. The process of claim 7 wherein the polymerization catalyst comprises from about 0.05% to about 3.0% by weight of the fluid.

9. The process of claim 6 wherein the polymerizable acrylate ester monomer is a polymerizable polyacrylate ester monomer and the organic hydroperoxide comprises from about 0.1% to about 10% by weight of the anaerobic composition.

10. The process of claim 9 wherein the organic hydroperoxide has the formula ROOH wherein R is a hydrocarbon group containing up to about 18 carbon atoms and the polyacrylate ester monomer has the formula:

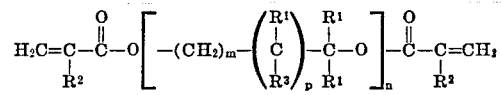

wherein $R^1$ represents a radical selected from the group consisting of hydrogen, lower alkyl of from 1 to about 4 carbon atoms, hydroxy alkyl of from 1 to about 4 carbon atoms, and

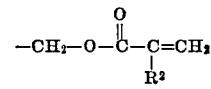

$R^2$ is a radical selected from the group consisting of hydrogen, halogen, and lower alkyl of from 1 to about 4 carbon atoms; $R^3$ is a radical selected from the group consisting of hydrogen, hydroxyl,

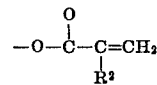

$m$ is an integer equal to at least 1; $n$ is an integer equal to at least 1; and $p$ is one of the following: 0, 1.

11. The process of claim 9 wherein the polyacrylate ester monomer is a polyethylene glycol dimethacrylate.

12. The process of claim 6 wherein the encapsulated anaerobic composition has an average particle size of from about 50 to about 750 microns.

References Cited

UNITED STATES PATENTS

| 2,969,330 | 1/1961 | Brynko | 252—316 |
| 3,218,305 | 11/1965 | Krieble | 260—89.5 R |
| 3,249,595 | 5/1966 | Lederer et al. | 260—89.5 R X |
| 3,179,143 | 4/1965 | Schultz et al. | 151—41.7 |

RICHARD D. LOVERING, Primary Examiner

U.S. Cl. X.R.

117—100 A; 151—41.7; 161—DIG 1; 252—182; 260—89.5 A, 89.5 AW, 89.5 H, 89.5 R; 264—4